(12) United States Patent
Sato

(10) Patent No.: US 12,206,092 B2
(45) Date of Patent: Jan. 21, 2025

(54) METHOD FOR PRODUCING SECONDARY BATTERY ELECTRODE AND METHOD FOR PRODUCING SECONDARY BATTERY

(71) Applicant: Prime Planet Energy & Solutions, Inc., Tokyo (JP)

(72) Inventor: Hitoshi Sato, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 417 days.

(21) Appl. No.: 17/684,378

(22) Filed: Mar. 1, 2022

(65) Prior Publication Data

US 2022/0285668 A1   Sep. 8, 2022

(30) Foreign Application Priority Data

Mar. 8, 2021   (JP) ................. 2021-036666

(51) Int. Cl.
*H01M 4/139*   (2010.01)
*B32B 37/12*   (2006.01)
(Continued)

(52) U.S. Cl.
CPC ......... *H01M 4/139* (2013.01); *B32B 37/1284* (2013.01); *H01M 4/0404* (2013.01);
(Continued)

(58) Field of Classification Search
CPC ............... H01M 4/0435; H01M 4/139; H01M 4/0404; H01M 4/04; H01M 4/1391; B32B 37/1284; B32B 2457/10; B29C 43/006
See application file for complete search history.

(56) References Cited

U.S. PATENT DOCUMENTS 3,775,190 A * 11/1973 Oakley ............... H01M 4/0404
29/623.3
2012/0244433 A1   9/2012 Yamasaki
(Continued)

FOREIGN PATENT DOCUMENTS

CN   102656723 A   9/2012
CN   102856579 A   1/2013
(Continued)

OTHER PUBLICATIONS

Coates et al, "The electrochemical deposition of additives to the nickel electrode," Fourteenth Annual Battery Conference on Applications and Advances. Proceedings of the Conference (Cat. No.99TH8371), Long Beach, CA, USA, 1999, pp. 319-323. (Year: 1999).*

*Primary Examiner* — A. Dexter Tugbang
(74) *Attorney, Agent, or Firm* — HAUPTMAN HAM, LLP

(57) ABSTRACT

The method for producing an electrode disclosed here is a method for producing an electrode having an electrode current collector and an electrode active substance layer, and includes the following steps: a step for preparing a powdery electrode material containing at least an electrode active substance and a binder; a step for passing the electrode material between a pair of opposing rollers so as to form the electrode active substance layer comprising the electrode material; a step for pressing the electrode active substance layer, wherein the pressing comprises pressing at a linear pressure of 1 ton/cm or more; a step for coating an adhesive liquid containing at least an adhesive resin on the electrode current collector; and a step for supplying the electrode active substance layer to the current collector on which the adhesive liquid has been coated so as to construct an electrode.

8 Claims, 3 Drawing Sheets

(51) Int. Cl.
  *H01M 4/04*      (2006.01)
  *H01M 10/0525*   (2010.01)
  *B29C 43/00*         (2006.01)
  *H01M 4/1391*        (2010.01)

(52) U.S. Cl.
  CPC ..... *H01M 4/0435* (2013.01); *H01M 10/0525* (2013.01); *B29C 43/006* (2013.01); *B32B 2457/10* (2013.01); *H01M 4/04* (2013.01); *H01M 4/1391* (2013.01)

(56) References Cited

U.S. PATENT DOCUMENTS

| | | | |
|---|---|---|---|
| 2013/0004843 A1 | 1/2013 | Suzuki et al. | |
| 2013/0330615 A1 | 12/2013 | Morita et al. | |
| 2014/0023922 A1* | 1/2014 | Isshiki | H01M 4/0435 |
| | | | 429/211 |
| 2016/0240839 A1* | 8/2016 | Umeyama | H01M 4/0435 |
| 2017/0133659 A1 | 5/2017 | Sakashita et al. | |
| 2020/0251715 A1 | 8/2020 | Matsushita et al. | |

FOREIGN PATENT DOCUMENTS

| | | |
|---|---|---|
| CN | 103392249 A | 11/2013 |
| CN | 106471665 A | 3/2017 |
| CN | 111540902 A | 8/2020 |
| JP | 200030694 A | 1/2000 |
| JP | 200184985 A | 3/2001 |
| JP | 2013045659 A | 3/2013 |
| JP | 2013143304 A * | 7/2013 |
| JP | 2016213094 A | 12/2016 |
| JP | 2019145285 A | 8/2019 |
| JP | 2019145286 A | 8/2019 |
| JP | 202098745 A | 6/2020 |

* cited by examiner

METHOD FOR PRODUCING SECONDARY BATTERY ELECTRODE AND METHOD FOR PRODUCING SECONDARY BATTERY

CROSS REFERENCE TO RELATED APPLICATIONS

This application claims priority on the basis of Japanese Patent Application No. 2021-036666, which was filed on 8 Mar. 2021, and the entire contents of that application are incorporated by reference in this specification.

BACKGROUND OF THE DISCLOSURE

1. Technical Field

The present disclosure relates to a method for producing an electrode and a method for producing a secondary battery.

2. Description of Background

Secondary batteries such as lithium ion secondary batteries are lighter and have higher energy density than existing batteries, and are therefore advantageously used as high output power sources for fitting to vehicles and as power sources for personal computers and handheld terminals. In particular, lithium ion secondary batteries can be advantageously used as high output power sources for propelling vehicles such as battery electric vehicles (BEV), hybrid electric vehicles (HEV) and plug in hybrid electric vehicles (PHEV).

Examples of typical structures of positive electrodes and negative electrodes provided in this type of secondary battery (hereinafter, the term "electrode" is used in cases where no particular distinction is made between a positive electrode and a negative electrode) include structures in which an electrode active substance layer comprising mainly an electrode active substance is formed on one surface or both surfaces of a foil-like electrode current collector. In general, current collectors have regions in which an electrode active substance layer is formed (coated parts) and regions in which an electrode active substance layer is not formed in order to connect a terminal for extracting an electrical current to the outside (uncoated parts). Japanese Patent Application Publication No. 2000-30694 discloses a method for producing an electrode by using an adhesive or a release agent on a current collector in order to advantageously produce coated parts and uncoated parts.

SUMMARY

There have been demands for higher performance of secondary batteries. Increasing the packing ratio of active substance layers so as to increase energy density can be given as one method for increasing performance. It is generally known that pressing is carried out with a relatively high pressing force (for example, a linear pressure of 1 ton/cm or more) in order to increase the packing ratio in active substance layers. In particular, all solid-state batteries such as those disclosed in Japanese Patent Application Publication No. 2019-145285, 2019-145286 and 2020-98745 require pressing with a higher pressing force than in the prior art.

However, as a result of diligent research, the inventors of the present invention found that in cases where rolling and pressing was carried out at a linear pressure of, for example, 1 ton/cm or more, multiple creases occurred in uncoated parts of an electrode current collector. An example of a cause of such creases occurring is differences in the length of extension in the direction of transport between coated parts and uncoated parts in the current collector. In addition, such creases tend to occur in greater numbers as the linear pressure increases during rolling and pressing, which leads to concerns regarding current collector breakage and processing defects in subsequent steps.

With these circumstances in mind, the primary purpose of the present disclosure is to provide a method for producing a high quality electrode in which the electrode packing ratio is high and creases and breakages in a current collector are prevented. Another purpose of the present disclosure is to provide a method for producing a battery provided with an electrode produced using said method for producing an electrode.

A method for producing a secondary battery electrode is provided in order achieve this objective. The production method disclosed here is a method for producing an electrode having an electrode current collector and an electrode active substance layer of a positive electrode or a negative electrode, and includes the following steps: a step for preparing a powdery electrode material containing at least an electrode active substance and a binder; a step for passing the electrode material between a pair of opposing rollers so as to form the electrode active substance layer comprising the electrode material; a step for pressing the electrode active substance layer, wherein the pressing comprises pressing at a linear pressure of 1 ton/cm or more; a step for coating an adhesive liquid containing at least an adhesive resin on the electrode current collector; and a step for supplying the electrode active substance layer to the current collector on which the adhesive liquid has been coated so as to construct an electrode.

According to such a configuration, it is possible to increase the electrode packing ratio by pressing with a pressing force that is a linear pressure of 1 ton/cm or more. In addition, because an electrode current collector is not present in the pressing step, it is possible to prevent creases from occurring in the electrode current collector and produce a high quality electrode in which breakage and the like does not occur in the current collector. Due to this configuration, it is possible to provide a production method that realizes a high quality electrode having a high electrode packing ratio.

In a preferred aspect of the production method disclosed here, the adhesive liquid contains a metal powder in addition to the adhesive resin. In another preferred aspect, the metal powder contains at least one type of metal selected from the group consisting of nickel, iron, chromium, aluminum, platinum, palladium, silver and copper or an alloy containing said metals as a constituent element.

By incorporating this type of electrically conductive metal powder in the adhesive liquid, it is possible to produce a battery in which electrical conductivity of the electrode current collector and the electrode active substance layer is improved and an increase in battery resistance is suppressed.

In a preferred aspect of the production method disclosed here, the electrode material prepared in the preparation step is prepared so that the solids content in the electrode material is 70 mass % or more.

According to such a configuration, it is possible to advantageously form an electrode active substance layer in the production method described above.

A preferred aspect of the production method disclosed here is characterized in that polytetrafluoroethylene (PTFE) is not contained as the binder.

According to such a configuration, it is possible to advantageously improve the electrode packing ratio by not incorporating polytetrafluoroethylene (PTFE), which hinders an improvement in electrode packing ratio.

A method for producing a secondary battery is provided in order achieve the other objective mentioned above. The method for producing a battery disclosed here is a method for producing a secondary battery comprising an electrolyte and an electrode body, which comprises a positive electrode having a positive electrode active substance layer on a positive electrode current collector and a negative electrode having a negative electrode active substance layer on a negative electrode current collector, and is characterized by including: a step for producing the electrode body using the positive electrode and the negative electrode; and a step for accommodating the electrode body and the electrolyte in a battery case, with at least one of the positive electrode and the negative electrode being produced using the method for producing an electrode mentioned above.

According to such a configuration, it is possible to advantageously produce a secondary battery using an electrode having the characteristics mentioned above.

DETAILED DESCRIPTION

Detailed explanations will now be given of the method for producing an electrode disclosed here and a method for producing a battery provided with said electrode by using, as an example, an electrode advantageously used in a lithium ion secondary battery, which is a typical type of secondary battery.

Matters other than those explicitly mentioned in the present specification but which are essential for carrying out the invention are matters that a person skilled in the art could understand to be matters of design on the basis of the prior art in this technical field. Details of features disclosed here can be implemented on the basis of the matters disclosed in the present specification and common general technical knowledge in this technical field.

In addition, dimensional relationships (length, width, height and so on) do not reflect actual dimensional relationships.

Moreover, in the present specification, a numerical range indicated by "A to B (where A and B are arbitrary values)" means not lower than A and not higher than B.

In the present specification, the term "secondary battery" is a general term for a battery able to be repeatedly charged. The term "lithium ion secondary battery" means a secondary battery in which lithium ions are used as charge carriers and charging and discharging are effected by means of charge transfer involving lithium ions between positive and negative electrodes. In addition, in the present specification, the term "electrode" is used if there is no need to make a particular distinction between a positive electrode and a negative electrode.

First Embodiment

Figure 1:
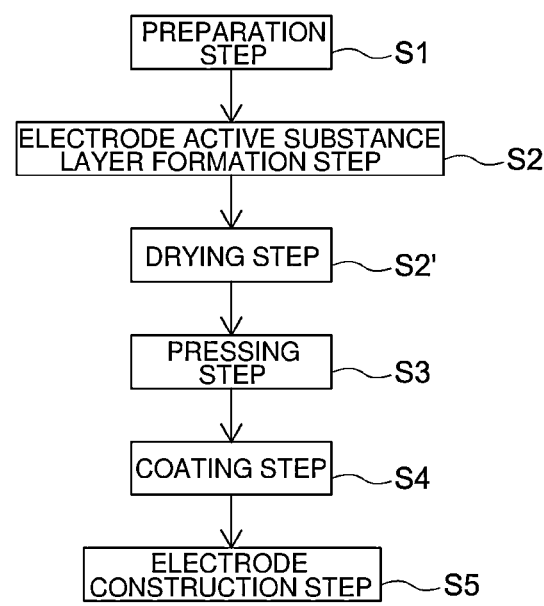
FIG. 1 is a flow chart that shows the general process of an electrode production method according to one embodiment.

FIG. 1 is a flow chart that shows the method for producing an electrode disclosed here. The production method of the first embodiment typically includes steps (S1) to (S5). In addition, the production method of the first embodiment may include step (S2'). The method for producing an electrode disclosed here is characterized by forming an electrode active substance layer in a state whereby an electrode current collector is not present, and then pressing. Therefore, other steps are not particularly limited, and may be similar to features used in this type of production method in the past.

Without intending to place particular limitations on the present disclosure, detailed explanations will now be given of features disclosed here by using, as an example, a case where an electrode is produced using a moisture powder containing a small amount of a solvent.

Preparation Step S1

In the preparation step S1, a powdered electrode material is prepared by stirring and mixing at least an electrode active substance and a binder. The electrode material typically contains a powdered electrode active substance and a binder. In addition to the electrode active substance and the binder, the electrode material may also contain other materials (for example, an electrically conductive material). However, the electrode material does not contain a liquid dispersion medium capable of increasing fluidity through dispersion of the powdered electrode material mentioned above. The binder should be such that the electrode material as a whole is in a powdered form. For example, the binder per se may be powdered, and the binder may be integrated with the powdered electrode active substance so as to achieve a powdered state overall. For example, the binder may adhere as particles or fibers to the surface of active substance particles that constitute the active substance powder.

As a preferred example, the electrode material may be granulated particles that are integrated in a particulate form through aggregation of at least an electrode active substance and a binder. The granulated particles contain at least active substance particles and a binder. The granulated particles typically contain a plurality of active substance particles and a binder. The granulated particles may be in a form whereby the binder adheres to the surface of individual active substance particles and a plurality of active substance particles are bound to each other by the binder. The binder is not locally distributed in an uneven manner in the inner part and at the outer surface of the granulated particles, and is generally evenly dispersed. In cases where an electrically conductive material is contained, the electrically conductive material is preferably blended in a dispersed state in the binder.

The average particle diameter of the granulated particles is not particularly limited. The average particle diameter of the granulated particles is greater than the average particle diameter of individual electrode active substance particles, with a preferred example thereof being approximately 50 μm or more (for example, not less than 100 μm and not more than 300 μm).

Moreover, in the present specification, "average particle diameter" means the particle diameter corresponding to a cumulative 50 volume % from the small particle diameter side in a volume-based particle size distribution measured using an ordinary laser diffraction/light-scattering method (that is, the $D_{50}$ particle diameter or median diameter).

The electrode material contains at least the electrode active substance and the binder as solid components.

One or more compounds having a composition used as a negative electrode active substance or positive electrode active substance of a conventional secondary battery (a lithium ion secondary battery in this case) can be used without particular limitation as an electrode active substance that is a primary component of the solid components. For example, carbon materials such as graphite, hard carbon and soft carbon can be given as examples of the negative electrode active substance. In addition, examples of the positive electrode active substance include lithium-transition metal composite oxides such as $LiNi_{1/3}Co_{1/3}Mn_{1/3}O_2$, $LiNiO_2$, $LiCoO_2$, $LiFeO_2$, $LiMn_2O_4$ and $LiNi_{0.5}Mn_{1.5}O_4$, and lithium-transition metal phosphate compounds such as $LiFePO_4$. The average particle diameter of the electrode active substance is not particularly limited, but approximately 0.1 to 50 μm is suitable, and approximately 1 to 20 μm is preferred.

A material that is chemically stable as an electrode material should be selected and used as the binder from among a variety of materials able to bind an active substance. Specific examples thereof include rubbers such as styrene-butadiene copolymers (SBR) and acrylic acid-modified SBR resins (SBR-based latexes); cellulose-based polymers such as carboxymethyl cellulose (CMC); acrylic resins such as methacrylic acid ester polymers; and polyvinylidene fluoride (PVDF).

Moreover, the electrode material prepared in the preparation step S1 does not contain polytetrafluoroethylene (PTFE) as a binder. As a result of diligent research, the inventors of the present invention found that if a pressing treatment was carried out after adding polytetrafluoroethylene (PTFE) as a binder to an electrode material, it was difficult to improve the packing ratio of an electrode active substance layer. Although not particularly limited, polytetrafluoroethylene (PTFE) generally has the properties of an extremely low coefficient of friction and excellent self-lubricating properties, and it is surmised that by having such properties, polytetrafluoroethylene can inhibit an increase in density of solid materials even if a load is applied through pressing. One purpose of the method for producing an electrode disclosed here is to improve the electrode packing ratio. Therefore, this purpose can be more advantageously achieved by not incorporating polytetrafluoroethylene (PTFE) as a binder.

The electrode material may contain substances other than the electrode active substance and the binder as solid components, such as electrically conductive materials and thickening agents. Preferred examples of electrically conductive materials include carbon materials such as carbon nanotubes and carbon black, such as acetylene black (AB). In addition, carboxymethyl cellulose (CMC), methyl cellulose (MC), or the like, can be advantageously used as a thickening agent. The electrode material may contain materials other than those mentioned above (for example, a variety of additives and the like) as long as the advantageous effect of the present disclosure is not impaired.

Moreover, in the present specification, the term "solid components" means materials excluding the solvent among the materials contained in the electrode material (that is, solid materials), and the term "solids content" means the ratio of solid components relative to the electrode material obtained by mixing all the materials.

The powdered electrode material can be prepared by, for example, mixing the materials mentioned above using a well-known conventional method and, if necessary, carrying out granulation, classification, and the like. The mixing method may be a dry mixing method or a wet mixing method. This mixing apparatus can be a conventional well-known mixing apparatus, such as a planetary mixer, a ball mill, a roller mill, a kneader or a homogenizer.

In the first embodiment, a moisture powder containing a small amount of solvent can be advantageously produced by first mixing solid materials, carrying out a solvent-less dry dispersion treatment, adding a liquid component such as a solvent, and then carrying out further mixing.

The type of solvent is not particularly limited, and it is possible to use a solvent that is appropriate for the type and properties of the binder being used. For example, it is possible to use an aqueous solvent such as ion exchanged water or an organic solvent such as N-methyl-2-pyrrolidone (NMP). Moreover, in the present specification, the term "aqueous solvent" means a solvent in which the proportion of water is approximately 80 mass % or more, such as 95 mass % or more, of the overall solvent.

In a preferred example, the solids content in the moisture powder is at least 70 mass %, and is typically 75 mass % or more, such as 80 mass % or more, and is generally 95 mass % or less, such as 90 mass % or less. The solids content in the electrode material is higher than in a slurry-like composition used in a coating method, which is a conventional method for forming an electrode active substance layer. If the solids content falls within the range mentioned above, the electrode active substance, the binder and the solvent are favorably integrated and it is possible to granulate the materials into a so-called crumb-like state. If the granulated particles are in this type of crumb-like state, adhesion between granulated particles can be readily increased in the electrode active substance layer formation step S2, moldability of the electrode active substance layer is increased, and the formation step can be favorably carried out. In addition, reducing the amount of solvent has the effect of shortening the drying time.

The ratio of the amount of the electrode active substance relative to the total amount of solid components in the electrode material is preferably approximately 50 mass % or more and is, for example, more preferably 80 to 99 mass %, and further preferably 85 to 95 mass %. In addition, the ratio of the amount of the binder relative to the total amount of solid components in the electrode material is, for example, preferably 0.1 to 15 mass %, and more preferably 1 to 10 mass %. In addition, in cases where additives such as a thickening agent are incorporated, the ratio of the total amount of additives relative to the total amount of solid components in the electrode material is, for example, 7 mass % or less, and more preferably 5 mass % or less.

Electrode Active Substance Layer Formation Step S2

Figure 2:
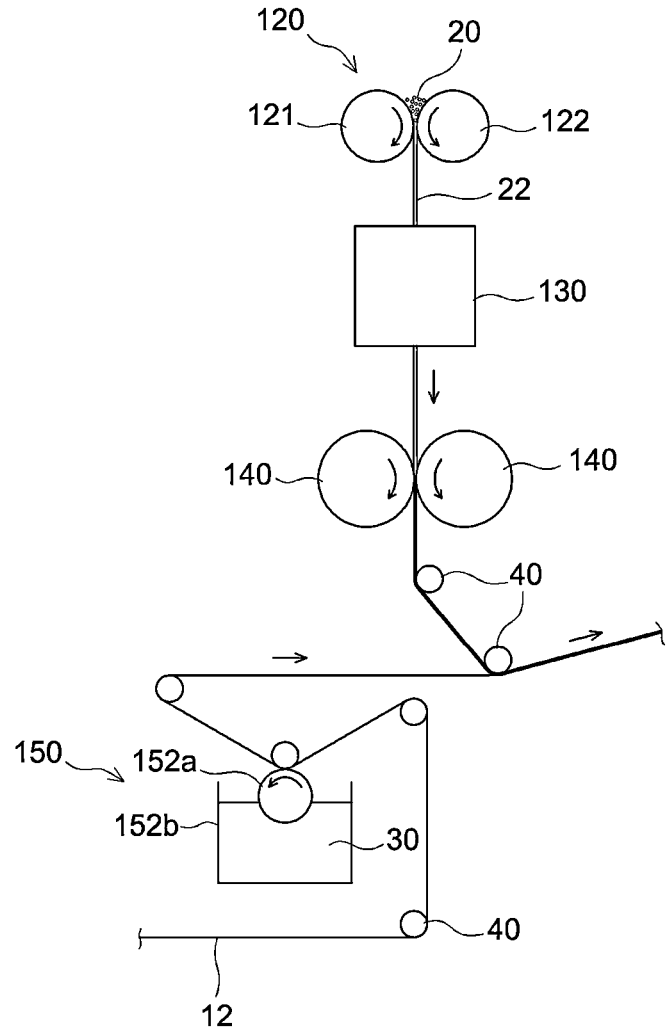
FIG. 2 is a block diagram that schematically illustrates the configuration of an electrode production apparatus according to one embodiment.

In the electrode active substance layer formation step S2, an electrode active substance layer comprising the electrode material (moisture powder) obtained in the preparation step S1 is formed. FIG. 2 is a diagram that schematically illustrates an electrode production apparatus 100 relating to the method for producing an electrode disclosed here. Formation of the electrode active substance layer 22 comprising the electrode material 20 can be carried out using a roll-to-roll film formation apparatus 120 such as that schematically illustrated in FIG. 2. The roll-to-roll film formation apparatus 120 comprises a first rotating roller 121 and a second rotating roller 122 that is disposed so as to face the first rotating roller 121. The outer peripheral surface of the first rotating roller 121 faces the outer peripheral surface of the second rotating roller 122, and this pair of rotating rollers 121, 122 can rotate in opposite directions from each other, as shown by the arrows in FIG. 2. The film-like electrode active substance layer 22 is formed by supplying the electrode material 20 between the first rotating roller 121 and the second rotating roller 122 so that the electrode material 20 is pressed by the pair of rollers.

The gap between the first rotating roller 121 and the second rotating roller 122 is a distance that corresponds to the desired thickness of the electrode active substance layer 22. In addition, by adjusting the size of this gap, it is possible to adjust the force that compresses the electrode material 20 passing between the first rotating roller 121 and the second rotating roller 122. Therefore, by adjusting the size of the gap between the first rotating roller 121 and the second rotating roller 122 according to the solids content in the electrode material 20 and the content of the binder, granulated particles are favorably integrated with each other and form a film when drawn.

The sizes of the first rotating roller 121 and the second rotating roller 122 are not particularly limited, and may be similar to sizes used in conventional film formation apparatuses, and can be, for example, diameters of 50 to 500 mm. The diameters of the first rotating roller 121 and the second rotating roller 122 may be the same as, or different from, each other. In addition, the materials of the outer peripheral surfaces of the first rotating roller 121 and the second rotating roller 122 may be the same as materials used in rotating rollers in well-known conventional roll-to-roll film formation apparatuses, and examples of these materials include SUS steel and SUJ steel.

Drying Step S2'

The first embodiment may include a step for drying the electrode active substance layer 22 (specifically, the moisture powder) obtained in the electrode active substance layer formation step S2. Moreover, in the present specification, the wording "the moisture powder is dry" means that the amount of solvent contained in the moisture powder is 2000 ppm or less. Therefore, if the solvent content falls within the range mentioned above, the drying step is not essential. For example, it is possible to form the electrode active substance layer 22 by carrying out the electrode active substance layer formation step S2, and then leave the electrode active substance layer to rest at room temperature of approximately 15 to 35° C. for a prescribed period of time (for example, 3 hours or less, and preferably 1 hour or less) so as to remove the solvent from the electrode active substance layer 22.

As shown in FIG. 2, the electrode active substance layer 22 is transported along a transportation pathway and introduced into a drying oven 130. This drying method is not particularly limited, but examples thereof include hot air current drying and infrared radiation drying. The temperature inside the drying oven is not particularly limited, but may be, for example, not less than 120° C. and not more than 200° C.

In cases where a coating film comprising a slurry-like electrode material was coated on an electrode current collector using this type of electrode production method in the past, the coating film contained a large amount of solvent, meaning that a drying step was essential. Because an electrode current collector is present in this type of drying step, differences in terms of drying shrinkage occur between the surface side and current collector side of the coating film, and the central part of the current collector becomes curved into a concave shape. If this curved part is corrected (that is, the curved part is flattened) by means of a step after the drying step, the electrode active substance layer cannot follow deformation of the electrode current collector, and cracking occurs in the active substance later.

However, the drying step is not essential in the method for producing an electrode disclosed here. In addition, because the solvent evaporates (volatilizes) in a state whereby the electrode current collector is not present, it is possible to prevent cracking from occurring in the electrode active substance layer.

Pressing Step S3

In the pressing step S3, the electrode active substance layer 22 is pressed with a high pressing force (for example, a linear pressure of 1 ton/cm or more) in order to improve the electrode packing ratio. The pressing step S3 can be carried out using, for example, a rolling and pressing machine 140 such as that schematically illustrated in FIG. 2. As shown in the diagram, the rolling and pressing machine 140 sandwiches and presses the electrode active substance layer 22 between a pair of rollers that rotate in opposite directions from each other. The gap between the pair of rollers can be adjusted so as to achieve properties (thickness and packing ratio) required of the electrode active substance layer 22.

By increasing the packing ratio of the electrode active substance layer (electrode), electrically conductive paths between active substance particles are improved and it is possible to realize a battery having a higher energy density. From such perspectives, the electrode packing ratio is preferably 65% or more, and more preferably 70% or more. Moreover, in the present specification, "electrode packing ratio" can be calculated by dividing the true electrode density by the apparent electrode density and then multiplying by 100. Here, the true electrode density is a value calculated on the basis of the densities and content values of the constituent components of the electrode. In addition, the apparent electrode density is a value obtained by dividing the mass (g) of the electrode by the apparent volume ($cm^3$) of the electrode.

Conditions for pressing the electrode active substance layer 22 are determined by setting the linear pressure to be, for example, 1 ton/cm or more so as to achieve the packing ratio mentioned above. These conditions vary depending on the material of the electrode active substance layer 22 and the film thickness at the time of formation, and are therefore not particularly limited, but in cases where rolling and pressing is carried out, the linear pressure may be, for example, not less than 1 ton/cm and not more than 6 ton/cm or not less than 2 ton/cm and not more than 5 ton/cm. In particular, in cases where an electrode to be used in a high capacity battery is subjected to rolling and pressing, the linear pressure can be set to 3 ton/cm or more (for example, not less than 3 ton/cm and not more than 6 ton/cm).

In cases where an electrode active substance layer is formed on an electrode current collector using this type of electrode production method used in the past, the electrode current collector has regions in which the active substance layer is formed (coated parts) and regions on which the electrode active substance layer is not coated (uncoated parts). In cases where rolling and pressing is carried out at a linear pressure of 1 ton/cm or more in a state whereby coated parts and uncoated parts are present on the current collector, multiple creases occur in uncoated parts because differences occur in the length of extension in the direction of transport between coated parts and uncoated parts. Specifically, parts having the electrode active substance layer are thicker than uncoated parts by an amount corresponding to the film thickness of the active substance layer, and therefore bear the pressing force exerted by the roller pressing. However, uncoated parts do not have the active substance layer, and are therefore subjected to less pressing force by the rolling and pressing, and are less likely to extend in the direction of transport. Multiple creases occur in the uncoated parts as a result of this difference in an extension between coated parts and uncoated parts. If such creases occur, the mechanical strength of the electrode current collector decreases. As a result, there are concerns regarding current collector breakage and the occurrence of processing defects in subsequent steps, which is not desirable. These multiple creases tend to occur in greater numbers as the pressing force increases, and if pressing is carried out at a high linear pressure (for example, a linear pressure of 3 ton/cm or more) in order to produce a high capacity battery, the occurrence of creases becomes significant.

However, unlike in this type of electrode production method used in the past, a pressing step is performed on an electrode active substance layer in a state whereby an electrode current collector is not present in the method for producing an electrode disclosed here. Due to this configuration, the occurrence of creases in a current collector can be naturally prevented.

The rolling and pressing machine 140 may be a hot rolling and pressing machine provided with a heating mechanism such as a heater. The heating means is not particularly limited as long as the whole of the pair of rollers in the rolling and pressing machine 140 can be uniformly heated to a prescribed temperature. For example, the heating means may be incorporated within the pair of rollers. The heating temperature is not particularly limited, but should be set, as appropriate, in view of the softening point of the binder contained in the electrode active substance layer 22, and the like, and may be, for example, not less than 150° C. and not more than 190° C. Needless to say, the heating temperature can be lower than a temperature at which undesirable degeneration of usage materials occurs.

Coating Step S4

The coating step S4 is a step in which an adhesive liquid 30 is coated on a separately prepared electrode current collector 12. Specifically, the coating step is a step in which the adhesive liquid 30, which contains at least an adhesive resin, is coated using a coating apparatus 150 while transporting the sheet-shaped electrode current collector 12, which has been transported from a supply chamber (not shown), along the longitudinal direction by transporting rollers 40. The coating step S4 can be carried out using a variety of intaglio printing devices, such as a gravure coater, or a variety of coating apparatuses such as a die coater such as a slit coater, a comma coater or a capillary coater (a CAP coater). Of these, coating by means of a gravure printing method is preferred from the perspective of being able to coat the adhesive liquid 30 at a relatively high speed.

A metal electrode current collector used as an electrode current collector of this type of secondary battery can be used without particular limitation as the electrode current collector 12. In cases where the electrode current collector 12 is a positive electrode current collector, the electrode current collector 12 is constituted from, for example, a metal material having good electrical conductivity, such as aluminum, nickel, titanium or stainless steel. Aluminum (for example, an aluminum foil) is particularly preferred. In cases where the electrode current collector 12 is a negative electrode current collector, the electrode current collector 12 is constituted from, for example, a metal material having good electrical conductivity, such as copper, and alloy comprising mainly copper, nickel, titanium or stainless steel. Copper (for example, a copper foil) is particularly preferred. The thickness of the electrode current collector 12 is, for example, approximately 5 to 20 μm, and preferably 8 to 15 μm.

The adhesive liquid 30 is coated on a predetermined region of the electrode current collector 12. For example, the adhesive liquid is coated on a region corresponding to a region on which the electrode active substance layer 22 is to be formed (a coated part) when a battery is constructed as a secondary battery. In addition, the adhesive liquid 30 may be coated in a predetermined pattern on the electrode current collector 12. The adhesive liquid 30 should be able to favorably bond the electrode active substance layer 22 to the electrode current collector 12 and is preferably uniformly coated at a thickness of, for example, not less than 1 μm and not more than 20 μm.

In FIG. 2, a direct gravure roll coater is given as an example of the coating apparatus 150. The adhesive liquid 30 should be transferred to the electrode current collector 12 by means of direct gravure using a gravure roller 152a having a fine pattern carved on the surface thereof. The outer peripheral surface of the gravure roller 152a has a groove for holding the adhesive liquid 30. This groove may have a size of approximately 10 to 30 μm (for example, 20 μm). In the example shown in FIG. 2, the electrode current collector 12 is transported in such a way that a processing surface to be coated with the adhesive liquid 30 (that is, a surface on a side to be bonded to the electrode active substance layer 22) is brought into contact with the gravure roller 152a. The lower side of the gravure roller 152a is immersed in the adhesive liquid 30 stored in a storage tank 152b, and by rotating the gravure roller 152a, a prescribed amount of the adhesive liquid 30, which has been taken into the carved groove provided on the gravure roller 152a, is transported to the upper side of the roller (that is, the side of the roller that comes into contact with the electrode current collector 12). Due to this configuration, the adhesive liquid 30 stored in the storage tank 152b is continuously transferred to the electrode current collector 12 via the groove on the gravure roller 152a. The electrode current collector 12 revolves around the transporting rollers 40 and is transported along the transportation pathway with the adhesive liquid 30-coated processing surface facing upwards.

The adhesive liquid 30 is typically a liquid obtained by dispersing or dissolving an adhesive resin in a solvent. An aqueous solvent or a non-aqueous solvent can be used as the solvent of the adhesive liquid 30. Water or a mixed solvent comprising mainly water can be advantageously used as the aqueous solvent. Solvent components other than water that constitute the mixed solvent can be one or two or more types selected as appropriate from among organic solvents able to be homogeneously mixed with water (lower alcohols, lower ketones, and the like). For example, it is preferable to use an aqueous solvent in which 80 mass % or more (more preferably 90 mass % or more, and further preferably 95 mass % or more) of the aqueous solvent is water. In addition, the solvent in the adhesive liquid 30 is not limited to a so-called aqueous solvent, and may also be a non-aqueous solvent (an organic solvent-based solvent). N-methyl-2-pyrrolidone (NMP) can be given as an example of a non-aqueous solvent.

A material able to be dispersed or dissolved in the solvent being used is preferably used as the adhesive resin of the adhesive liquid 30. This adhesive resin is typically a polymer material and may be the same as, or different from, a material used for producing the granulated particles in the preparation step S1 mentioned above. For example, in cases where an aqueous solvent is used as the solvent, it is preferable to use a rubber such as a styrene-butadiene copolymer (SBR) or an acrylic acid-modified SBR resin (an SBR-based latex), or an acrylic resin such as poly(acrylic acid) (PAA). In addition, in cases where a non-aqueous solvent is used as the solvent, a vinyl halide resin, such as poly(vinylidene fluoride) (PVDF) or polytetrafluoroethylene (PTFE), or an acrylic resin, such as an acrylic acid ester or methacrylic acid ester polymer, can be advantageously used as a binder. In cases where an electrode for a positive electrode of a lithium ion secondary battery is to be produced, a preferred example of the adhesive liquid 30 is one in which NMP is used as a solvent and PVDF is blended as an adhesive resin. In addition, in cases where an electrode for a negative electrode of a lithium ion secondary battery is to be produced, a preferred example of the adhesive liquid 30 is one in which water is used as a solvent and a SBR is blended as an adhesive resin.

The adhesive liquid 30 may further contain a metal powder in addition to the adhesive resin mentioned above. The type of metal powder is not particularly limited as long as this metal powder is electrically conductive. Specific examples thereof include individual metals, such as nickel (Ni), iron (Fe), chromium (Cr), gold (Au), silver (Ag), copper (Cu), platinum (Pt), palladium (Pd), ruthenium (Ru) and aluminum (Al), and alloys containing these metals as constituent elements. Of these, the metal powder preferably contains at least one type of metal selected from the group consisting of nickel, iron, chromium, aluminum, platinum, palladium, silver and copper or an alloy containing these metals as constituent elements. Examples of alloys containing the metals mentioned above as constituent elements include stainless steel (SUS), nickel alloys and aluminum alloys, and stainless steel (SUS) is particularly preferred. The average particle diameter of the metal powder is not particularly limited, but may generally be not less than 0.01 μm and not more than 10 μm.

Electrode Construction Step S5

The electrode construction step S5 is a step in which an electrode is constructed by supplying the thus obtained electrode active substance layer 22 to the electrode current collector 12 on which the adhesive liquid 30 has been coated. Specifically, an electrode is constructed by supplying the electrode active substance layer 22, in which the packing ratio has been adjusted, to the sheet-shaped electrode current collector 12 on which the adhesive liquid 30 has been coated, thereby bonding the active substance layer 22 to the current collector 12. Due to this configuration, it is possible to produce an electrode in which the electrode active substance layer 22 is provided on one surface of the electrode current collector 12.

Moreover, in cases where an electrode having the electrode active substance layer 22 on both sides of the electrode current collector 12 is to be produced, the adhesive liquid 30 is coated on the surface (back surface) of the current collector 12 on which the active substance layer 22 has not been formed in a produced electrode and an electrode active substance layer 22 produced in the same way as in steps Si to S3 above is then supplied to this back surface. Here, it is possible to wind an electrode having an active substance layer formed on one surface thereof into the form of a roll, draw the electrode out again, and then form an active substance layer on the back surface of the electrode. Alternatively, it is possible to form an active substance layer by continuously coating the adhesive liquid on the back surface of an electrode without winding an electrode having an active substance layer formed on one surface thereof into the form of a roll.

A sheet-shaped electrode produced in this way can be used as this type of conventional sheet-shaped positive electrode or negative electrode to construct a secondary battery.

Second Embodiment

A production method of a second embodiment typically includes steps (S11) to (S15), which correspond to steps (S1) to (S5) in the first embodiment. This production method is characterized by preparing an electrode material that contains substantially no solvent in a preparation step S11. Other than the matters mentioned below, the second embodiment is similar to the first embodiment described above, and detailed explanations will therefore be omitted.

Moreover, in the present specification, the expression "containing substantially no solvent" means that a solvent is not intentionally added, and means either that no solvent whatsoever is contained or that a solvent is contained at such a small quantity (a so-called contaminant level) as to be meaningless in the production method disclosed here.

Preparation Step S11

In the preparation step S11, a powdered electrode material is prepared by stirring and mixing at least an electrode active substance and a binder. The electrode material can be selected, as appropriate, from electrode active substances and binders similar to those used in the first embodiment described above. In addition to the electrode active substance and the binder, the electrode material may also contain other materials (for example, an electrically conductive material). However, the electrode material prepared in the preparation step S11 does not contain a liquid dispersion medium capable of increasing fluidity through dispersion of the powdered electrode material mentioned above.

As a preferred example, the electrode material may be granulated particles that are integrated in a particulate form through aggregation of at least an electrode active substance and a binder. The granulated particles contain at least one (and preferably multiple) active substance particles and a binder. The granulated particles may be in a form whereby the binder adheres to the surface of individual active substance particles and a plurality of active substance particles are bound to each other by the binder. The binder is not locally distributed in an uneven manner in the inner part and at the outer surface of the granulated particles, and is generally evenly dispersed. In cases where an electrically conductive material is contained, the electrically conductive material is preferably blended in a dispersed state in the binder.

A material that is chemically stable as an electrode material should be selected and used as the binder from among a variety of materials able to bind an active substance. However, the electrode material prepared in the preparation step S11 does not contain polytetrafluoroethylene (PTFE) as a binder.

The powdered electrode material can be prepared by, for example, mixing using a dry mixing method and, if necessary, carrying out granulation, classification, and the like. This mixing apparatus is not particularly limited, and the mixing can be carried out using a conventional well-known mixing apparatus, such as a planetary mixer, a ball mill, a roller mill, a kneader or a homogenizer.

Moreover, in the second embodiment, a dry powder in which the solid materials are highly dispersed can be advantageously produced by subjecting the electrode material to a solvent-less dry dispersion treatment.

In a preferred example of the second embodiment, the dry powder contains substantially no solvent (that is, the solids content is 100 mass %). According to this type of configuration, the electrode packing ratio can be readily improved and it is possible to obtain an electrode having a high energy density. In addition, because the dry powder contains substantially no solvent, there is no need to carry out a drying step in the production process and there is no need to install a solvent recovery apparatus, and it is therefore possible to greatly reduce production costs. Furthermore, because the dry powder contains substantially no solvent, there is no occurrence of migration, which is a phenomenon in which a binder having a low specific gravity is unevenly distributed towards the surface side. Therefore, by using a dry powder, the electrode packing ratio is improved and a high quality electrode can be advantageously produced.

Method for Producing Battery

An electrode body is produced using the sheet-shaped electrode produced in the manner described above. Specifically, an electrode body is produced by layering the sheet-shaped positive electrode and sheet-shaped negative electrode, with a sheet-shaped separator interposed therebetween. Here, at least one of the sheet-shaped positive electrode and negative electrode is a sheet-shaped electrode produced using the method for producing an electrode disclosed here.

Examples of the separator include porous sheets (films) comprising resins such as polyethylene (PE), polypropylene (PP), polyesters, cellulose and polyamides. This type of porous sheet may have a single layer structure or a laminated structure having two or more layers (for example, a three layer structure obtained by laminating a PP layer on both surfaces of a PE layer). A heat-resistant layer (HRL) may be provided on the separator.

The sheet-shaped electrode can be used without further modification or used after being cut into a flat rectangular shape. For example, a wound electrode body can be produced by overlaying a sheet-shaped positive electrode and a sheet-shaped negative electrode and winding in the longitudinal direction in this overlaid state. For example, a layered electrode body can also be produced by layering a positive electrode and negative electrode that have been cut into a flat rectangular shape.

The electrode body and an electrolyte are then accommodated in a battery case. The material of the battery case is preferably a metallic material which is highly strong, lightweight and exhibits good thermal conductivity, and examples of such metallic materials include aluminum and steel.

In the case of a liquid-based lithium ion secondary battery, the electrolyte can be, for example, an electrolyte obtained typically by incorporating a supporting electrolyte in an organic solvent (a non-aqueous solvent). Organic solvents such as carbonates, esters, ethers, nitriles, sulfones and lactones can be used without particular limitation as the non-aqueous solvent. Lithium salts such as $LiPF_6$, $LiBF_4$ and $LiClO_4$ can be advantageously used as the supporting electrolyte. The concentration of the supporting electrolyte is not particularly limited, but is preferably approximately not less than 0.7 mol/L and not more than 1.3 mol/L.

Using the example given above, an explanation has been given of a construction method in the case of a liquid-based lithium ion secondary battery. However, a secondary battery to be constructed may be an all solid state lithium ion secondary battery. In the case of an all solid state lithium ion secondary battery, the battery can be configured by accommodating an electrode body, which is obtained by layering a positive electrode, a solid electrolyte and a negative electrode in that order, in a battery case (for example, a laminated case). Here, at least one of the positive electrode and negative electrode is an electrode produced using the method for producing an electrode disclosed here. For example, a variety of compounds that exhibit lithium ion conductivity (for example, amorphous sulfides, crystalline sulfides, amorphous oxides, crystalline oxides, crystalline oxynitrides, crystalline nitrides and crystalline iodides) can be used as the solid electrolyte.

Lithium ion Secondary Battery

Figure 3:
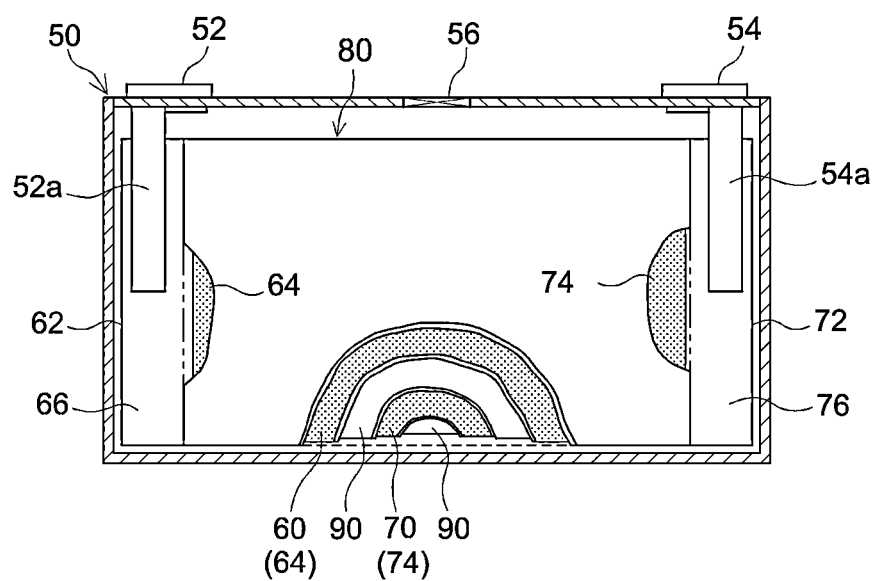
FIG. 3 is an explanatory diagram that schematically illustrates a lithium ion secondary battery according to one embodiment.

FIG. 3 shows an example of a liquid-based lithium ion secondary battery 200 able to be constructed using an electrode formed using the electrode production apparatus 100 described above.

The lithium ion secondary battery 200 shown in FIG. 3 is constructed by accommodating a flat wound electrode body 80 and a non-aqueous electrolyte solution (not shown) in a sealable box-shaped battery case 50. The battery case 50 is provided with a positive electrode terminal 52 and negative electrode terminal 54 for external connections, and a thin-walled safety valve 56, which is set to release the pressure inside the battery case 50 when this pressure exceeds a prescribed level. In addition, the battery case 50 is provided with an injection hole (not shown) for injecting the non-aqueous electrolyte solution. The positive electrode terminal 52 is electrically connected to a positive electrode current collector plate 52a. The negative electrode terminal 54 is electrically connected to a negative electrode current collector plate 54a.

The wound electrode body 80 typically has a form in which a long sheet-shaped positive electrode (hereinafter referred to as a positive electrode sheet 60) and a long sheet-shaped negative electrode (hereinafter referred to as a negative electrode sheet 70) are overlaid with a long sheet-shaped separator 90 interposed therebetween, and then wound in the longitudinal direction. The positive electrode sheet 60 has a configuration such that a positive electrode active substance layer 64 is formed in the longitudinal direction on one surface or both surfaces of a positive electrode current collector 62. The negative electrode sheet 70 has a configuration such that a negative electrode active substance layer 74 is formed in the longitudinal direction on one surface or both surfaces of a negative electrode current collector 72. One edge part of the positive electrode current collector 62 in the width direction is provided with a region in which the positive electrode active substance layer 64 is not formed along the edge part and in which the positive electrode current collector 62 is exposed (that is, a positive electrode active substance layer-uncoated part 66). The other edge part of the negative electrode current collector 72 in the width direction is provided with a region in which the negative electrode active substance layer 74 is not formed along the edge part and in which the negative electrode current collector 72 is exposed (that is, a negative electrode active substance layer-uncoated part 76). The positive electrode current collector plate 52a and the negative electrode current collector plate 54a are connected to the positive electrode active substance layer-uncoated part 66 and the negative electrode active substance layer-uncoated part 76, respectively.

A positive electrode and negative electrode obtained using the production method described above can be used as the positive electrode (positive electrode sheet 60) and the negative electrode (negative electrode sheet 70) respectively. Moreover, in the present example, the positive electrode and the negative electrode are such that the electrode active substance layer 22 (the positive electrode active substance layer 64 and the negative electrode active substance layer 74) are formed on both surfaces of the current collector 12 (the positive electrode current collector 62 and the negative electrode current collector 72).

The lithium ion secondary battery 200 constituted in the manner described above can be used in a variety of applications. Examples of preferred applications include motive power sources fitted to vehicles such as battery electric vehicles (BEV), hybrid electric vehicles (HEV) and plug in hybrid electric vehicles (PHEV). The lithium ion secondary battery 200 can also be used in the form of a battery pack in which a plurality of batteries are connected in series and/or in parallel.

Several working examples relating to the features disclosed here will now be explained, but the features disclosed here are in no way limited to these working examples.

First Experiment

An electrode was produced in accordance with the flow chart shown in FIG. 1 using the electrode materials mentioned below.

First, a lithium-transition metal oxide ($LiNi_{1/3}Co_{1/3}Mn_{1/3}O_2$) having an average particle diameter ($D_{50}$) of 20 μm, as measured using a laser diffraction scattering method, was used as a positive electrode active substance, poly(vinylidene fluoride) (PVDF) was used as a binder, acetylene black was used as an electrically conductive material, and NMP was used as a non-aqueous solvent.

Solid components comprising 90 parts by mass of the positive electrode active substance mentioned above, 2 parts by mass of PVDF and 8 parts by mass of acetylene black were placed in a stirring granulator (a planetary mixer or a high speed mixer) having a mixing blade, and a mixing and stirring treatment was carried out so as to obtain a powder material mixture comprising the solid materials mentioned above. NMP was added as a solvent to the obtained mixture so as to attain a solids content of 80 mass %, and further stirring was then carried out. A moisture powder (a positive electrode material) according to the present working example was produced in this way.

Next, a positive electrode active substance layer comprising the obtained positive electrode material was formed using the film formation apparatus mentioned above. The positive electrode active substance layer was heated and dried, and then subjected to rolling and pressing at a linear pressure of approximately 3 ton/cm.

A long sheet-shaped positive electrode current collector comprising an aluminum foil and an adhesive liquid were prepared. The adhesive liquid was a paste-like adhesive liquid obtained by dispersing a nickel powder having an average particle diameter of 2 μm in a solution obtained by dissolving PVDF in NMP. The adhesive liquid was coated on the current collector and transported along a transportation pathway, and the produced positive electrode active substance layer was bonded to the current collector. A positive electrode sheet in which the positive electrode active substance layer was formed on the sheet-shaped positive electrode current collector was obtained in this way (Working Example 1).

COMPARATIVE EXAMPLE 1

As a comparison, pressing was carried out in a state where an electrode active substance layer was formed on an electrode current collector. Specifically, the same electrode material (positive electrode material) as that in Working Example 1 was prepared and subjected to a mixing and stirring treatment. A positive electrode active substance layer comprising the positive electrode material obtained in the preparation step was formed using the film formation apparatus mentioned above.

Next, the same positive electrode current collector and adhesive liquid as in Working Example 1 were prepared, the adhesive liquid was coated on the positive electrode current collector, and the obtained positive electrode active substance layer was bonded to the current collector. The positive electrode active substance layer on the positive electrode current collector was heated and dried, and then subjected to rolling and pressing at a linear pressure of approximately 3 ton/cm. A positive electrode sheet in which the positive electrode active substance layer was formed on the sheet-shaped positive electrode current collector was obtained in this way (Comparative Example 1).

The condition of the obtained electrodes of Working Example 1 and Comparative Example 1 was observed by eye. In addition, the packing ratio of the obtained electrodes of Working Example 1 and Comparative Example 1 was calculated. Moreover, the electrode packing ratio was calculated by dividing the true electrode density by the apparent electrode density and then multiplying by 100. The true electrode density was calculated on the basis of the densities and content values of the constituent components of the electrode. In addition, the apparent electrode density was calculated by dividing the mass (g) of the electrode (the dried coating film) by the apparent volume ($cm^3$) of the electrode (the dried coating film). Next, the area as seen from above ($cm^2$) and thickness (cm) of the electrodes of Working Example 1 and Comparative Example 1 were measured, and the apparent volume was calculated by multiplying the area by the thickness.

The packing ratio of the electrode of Working Example 1 was 75%, and the packing ratio of the electrode of Comparative Example 2 was 70%. It was understood that a high packing ratio can be achieved by carrying out rolling and pressing at a linear pressure of approximately 3 ton/cm. However, a plurality of creases occurred in uncoated portions of the positive electrode sheet in Comparative Example 1, in which a pressing step was carried out after bonding the electrode active substance layer to the current collector. In addition, cracking occurred in the electrode active substance layer. Conversely, creases did not occur in uncoated portions of the positive electrode sheet and cracking did not occur at the surface of the positive electrode active substance layer in Working Example 1, in which the pressing step was carried out in a state where an electrode current collector was not present.

Therefore, by carrying out the pressing step in a state where an electrode current collector is not present, it is possible to achieve a high electrode packing ratio and produce a high quality electrode in which creases and breakage in a current collector can be prevented.

Second Experiment

As a second experiment, electrode packing ratio was investigated. As a comparison, an electrode comprising an electrode material obtained using polytetrafluoroethylene (PTFE) as a binder was produced. Specifically, a lithium-transition metal oxide ($LiNi_{1/3}Co_{1/3}Mn_{1/3}O_2$) having an average particle diameter ($D_{50}$) of 20 μm, as measured using a laser diffraction scattering method, was used as a positive electrode active substance, polytetrafluoroethylene (PTFE) was used as a binder, acetylene black was used as an electrically conductive material, and NMP was used as a non-aqueous solvent.

Solid components comprising 90 parts by mass of the positive electrode active substance mentioned above, 2 parts by mass of PTFE and 8 parts by mass of acetylene black were mixed under the same conditions as those used in Working Example 1 so as to obtain a powder material mixture comprising the solid materials mentioned above. NMP was added as a solvent to the obtained mixture so as to attain a solids content of 80 mass %, and further stirring was then carried out.

Next, a positive electrode active substance layer comprising the obtained positive electrode material was formed using the film formation apparatus mentioned above. The positive electrode active substance layer was heated and dried, and then subjected to rolling and pressing at a linear pressure of approximately 3 ton/cm.

The same positive electrode current collector and adhesive liquid as in Working Example 1 were prepared, the adhesive liquid was coated on the positive electrode current collector, and the obtained positive electrode active substance layer was bonded to the current collector. A positive electrode sheet in which the positive electrode active substance layer was formed on the sheet-shaped positive electrode current collector was obtained in this way (Comparative Example 2).

The packing ratio of the obtained electrodes of Working Example 1 and Comparative Example 2 was calculated. Moreover, the electrode packing ratio was calculated using the same method as that described above.

The packing ratio of the electrode of Working Example 1 was 75%, and the packing ratio of the electrode of Comparative Example 2 was 60%. That is, by not incorporating polytetrafluoroethylene (PTFE) as a binder, it is possible to improve the electrode packing ratio.

Specific examples of the present disclosure have been explained in detail above, but these are merely examples, and do not limit the scope of the claims.

The features set forth in the claims also encompass modes obtained by variously modifying or altering the specific examples shown above.

What is claimed is:

1. A method of producing a secondary battery electrode having an electrode current collector and an electrode active substance layer of a positive electrode or a negative electrode, the method comprising:
    preparing a powdery electrode material containing at least an electrode active substance and a binder;
    passing the powdery electrode material between a pair of opposing rollers so as to form the electrode active substance layer comprising the powdery electrode material;
    pressing the electrode active substance layer, wherein the pressing comprises pressing at a linear pressure of 1 ton/cm or more;
    coating an adhesive liquid containing at least an adhesive resin on the electrode current collector; and
    supplying the pressed electrode active substance layer to the electrode current collector on which the adhesive liquid has been coated so as to construct the positive or negative electrode, wherein in said supplying of the pressed electrode active substance layer, the pressed electrode active substance layer and the electrode current collector are integrated by only the adhesive liquid.

2. The method according to claim 1, wherein
    the adhesive liquid contains a metal powder in addition to the adhesive resin.

3. The method according to claim 2, wherein
    the metal powder contains at least one type of metal selected from the group consisting of nickel, iron, chromium, aluminum, platinum, palladium, silver and copper or an alloy containing said metals as constituent elements.

4. The method according to claim 1, wherein
    the powdery electrode material prepared in said preparing is prepared so that a solids content in the powdery electrode material is 70 mass % or more, and
    the solids content is a ratio of the electrode active substance and the binder relative to a solvent in the powdery electrode material.

5. The method according to claim 1, wherein polytetrafluoroethylene (PTFE) is not contained as the binder.

6. The method according to claim 1, wherein
    in said pressing of the electrode active substance layer, the electrode active substance layer is pressed in a state where the electrode current collector is not present.

7. A method of producing a secondary battery provided with: an electrode body, which comprises a positive electrode having a positive electrode active substance layer on a positive electrode current collector and a negative electrode having a negative electrode active substance layer on a negative electrode current collector; and an electrolyte, the method comprising:
    producing at least one of the positive electrode or the negative electrode by
        preparing a powdery electrode material containing at least an electrode active substance and a binder;
        passing the powdery electrode material between a pair of opposing rollers so as to form a corresponding positive or negative electrode active substance layer comprising the powdery electrode material;
        pressing the corresponding positive or negative electrode active substance layer, wherein the pressing comprises pressing at a linear pressure of 1 ton/cm or more;
        coating an adhesive liquid containing at least an adhesive resin on a corresponding positive or negative electrode current collector; and
        supplying the pressed corresponding positive or negative electrode active substance layer to the corresponding positive or negative electrode current collector on which the adhesive liquid has been coated so as to construct the at least one of the positive electrode or the negative electrode, wherein in said supplying of the pressed corresponding positive or negative electrode active substance layer, the pressed corresponding positive or negative electrode active substance layer and the corresponding positive or negative electrode current collector are integrated by only the adhesive liquid;
    producing the electrode body using the produced at least one of the positive electrode or the negative electrode; and
    accommodating the electrode body and the electrolyte in a battery case.

8. The method according to claim 7, wherein
    in said pressing of the corresponding positive or negative electrode active substance layer, the corresponding positive or negative electrode active substance layer is pressed in a state where the corresponding positive or negative electrode current collector is not present.

* * * * *